3,490,684
ELECTRODYNAMIC VIBRATOR COMPRESSOR
Andreas Fredericus Rietveld and Albert Jan Meijer, Drachten, Netherlands, assignors to U.S. Philips Corporation, New York, N.Y., a corporation of Delaware
Filed Mar. 4, 1968, Ser. No. 710,360
Claims priority, application Netherlands, Mar. 23, 1967, 6704284
Int. Cl. F04b *35/04*
U.S. Cl. 230—55                                6 Claims

ABSTRACT OF THE DISCLOSURE

An electrodynamic vibrator compressor having a reciprocating plunger supported by a helical spring. The operative spring length and resultant rigidity may be adjusted so that the natural frequency of the plunger will be equal to the frequency of the alternating current driving the plunger.

---

The invention relates to an electrodynamic vibrator compressor, in which the part driven in a reciprocatory manner and supporting the compressor piston is supported with respect to the stator of the magnetic circuit by a spring system. The natural vibration frequency of the part moving in a reciprocatory manner substantially corresponds to the frequency of the driving alternating current.

In such compressors, the reciprocatory movement of the compressor piston is obtained by the vibratory movement performed by an A.C.-supplied coil in the field of a permanent magnet.

In order to obtain the optimum vibration conditions, it is desirable for the natural frequency of the moving part to be equal to the frequency of the alternating current. In practice, the natural frequency of the moving part cannot be accurately predicted owing to the various material deviations and the tolerances applied.

The invention has for an object to mitigate these disadvantages. A spring system is used which extends substantially in a plane at right angles to the direction of movement of the compressor piston. The spring in the proximity of the circumference of the spring system has an approximately circular and more particularly—helical course with respect to the centre of the spring system where the part driven in a reciprocatory manner is supported. The natural frequency of the part moving in a reciprocatory manner can be adjusted since the limbs of the spring lying in the proximity of the circumference of the spring system can be displaced with respect to a centrally fixed point when the spring system is rotated about its centre.

Thus, the natural frequency of the moving part can be adjusted in a simple manner to the frequency of the alternating current in the coil by choosing the correct value for the rigidity of the helical spring.

An additional advantage is that a variation of the natural frequency of the moving part occurring, for example, after a repair, can be neutralized by the aforesaid adjustability.

An advantageous embodiment is characterized in that the spring system comprising spring plates helically wound around each other and lying in planes parallel to the direction of movement of the piston, is arranged transversely between supporting columns which extend substantially parallel to the planes of the spring plates and are each provided with fastening means for the part of the spring plate extending along the column.

The columns have a cylindrical shape, and a simple construction can be obtained in which the ends of the columns are threaded at the area of the spring plate and the spring plate can be fixed in the adjusting position between nuts arranged on the screw-thread so as to be rotatable.

Since the leaf-spring ends are displaceable between the said clamping means and can be fixed, the length of the leaf-spring between the column and the centre of the helical spring body will be adjustable. A considerable improvement in fastening of the leaf-spring ends to the columns can be obtained by bending each of the leaf-spring ends in the form of a loop around an associated column, the limbs of the loop constituting a slot which is displaceable with respect to the column.

In order to avoid unduly large stress concentrations in the leaf-spring ends at the fastening points to the columns, spacers are interposed between the clamping means and the leaf spring which consist of a material which is considerably softer than that of the spring body.

The invention will now be described more fully with reference to the drawing, and further advantageous details will be disclosed.

Figure 1:
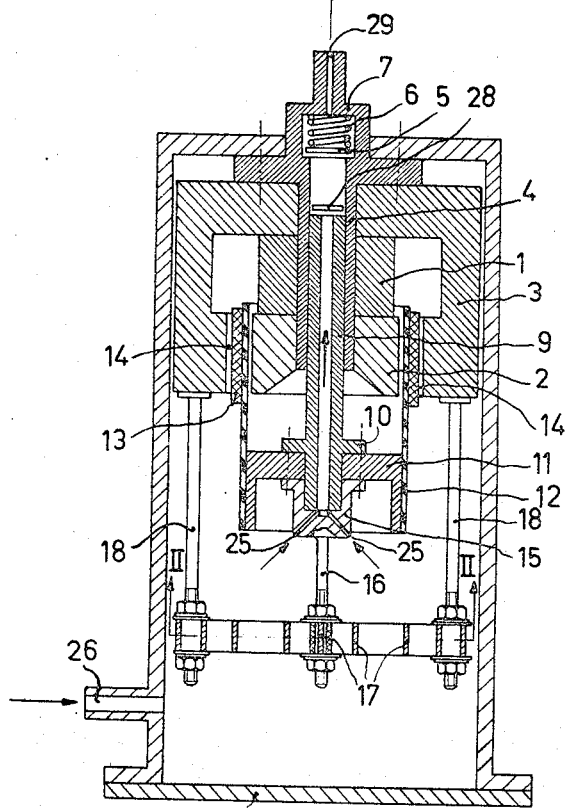
FIGURE 1 is a longitudinal sectional view of a vibrator compressor in accordance with the invention shown diagrammatically.

In FIGURE 1, reference numeral 1 denotes a permanent magnet having a pole piece 2 which together with the yoke 3 centrally supports the pump cylinder 4. This assembly constitutes the fixedly arranged mass of which the pressure valve 5 also forms part, which is urged by a spring 6 supported in the hood 7 which is disposed on the yoke 3.

The part of the compressor set into vibration comprises the hollow plunger 9 which is passed into the pump cylinder 4 and the projecting end of which is secured by means of the collar 10 and the disc 11 to the supporting ring 12 if the coil 13 in the air gap 14. This end is further provided with a supporting member 15 having inlet apertures 25. The freedom of movement of the moving part described above is limited in that the supporting member 15 is secured to the centre of a helical spring 17 the ends of which are secured by clamping in a manner described below to the columns 18 which are supported by the pole yoke 3.

Figure 2:
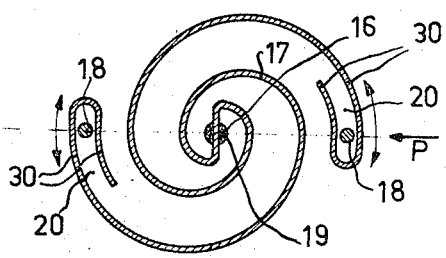
FIGURE 2 is a sectional view of the helical spring body taken on the line II—II of FIGURE 1.

FIGURE 2 illustrates that the centre of the helical spring body 17 is connected to a compressor shaft 16 by means of a slot 19 into which the spring 17 is inserted and in which it is fixed by means of nuts and spacers in the same manner as will be described below with respect to its fastening to the columns 18.

The ends of the spring 17 are bent in the form of an open loop 20 around the associated columns 18. By rotation about the shaft 16, the positions of the columns 18 in the loops 20 are adjusted so that, before the spring ends are fixed, the operative spring length and hence the rigidity of the spring 17 is adjusted. The limbs 30 of the loop 20 have a circular course with respect to the centre of the spring 17.

Figure 3:
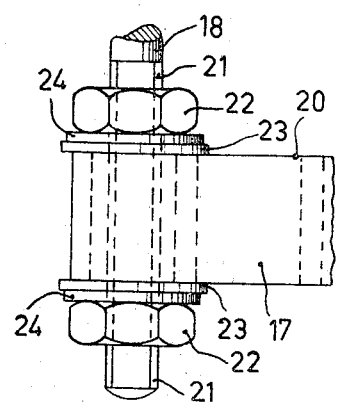
FIGURE 3 shows on an enlarged scale in side elevation a detail of the leaf-spring ends with the fastening means to a column, viewed in the direction of the arrow P of FIGURE 2.

FIGURE 3 shows the fastening of the spring ends by means of a screw-thread 21 on the column 18 and fitting nuts 22 between which the spring 17 is clamped at its lateral edges. Use is made of spacers 23 which consist of a material which is considerably softer than that of the spring 17, while washers 24 are interposed between the nuts 22 and the spacers 23.

It appears from the diagrammatic elevation of FIGURE 1 that the compression medium can enter the compressor housing 27 through the duct 26 and is sucked up through the inlet apertures 25 of the hollow plunger 9 when the latter moves inwardly, the valve 28 then being opened. With the subsequent forward stroke of the plunger, the medium is pressed via the pressure valve 5 to the outside through the outlet aperture 29 on the hood 7. The pump strokes rapidly succeed each other due to the fact that the plunger 9 in the pump cylinder 4 is set into vibration by the current coil 13 in the air gap 14.

What is claimed is:

1. An electrodynamic vibrator compressor comprising a pump cylinder, a plunger mounted for reciprocal movement within the cylinder, electric oscillator means for driving the plunger, valve means for controlling the discharge flow from the plunger, a compressor shaft extending axially from the plunger at the end opposite from the discharge flow end, at least two columns extending from the oscillator means parallel to the compressor shaft, a helically wound spring having at least two free ends located in a plane transverse to the compressor shaft and secured at a point between the ends to the shaft, fastening means for adjustably securing the free ends of the spring to the columns so that the operative spring length can be varied and the natural vibration frequency of the plunger can be adjusted to correspond to the frequency of the oscillator alternating driving current.

2. An electrodynamic vibrator as claimed in claim 1, wherein the fastening means comprises screw threads defined in an end portion of the column and at least two fitting nuts adapted to be threaded onto said column and when tightened to clamp the spring between two of said nuts to releasably hold the spring in a fixed position.

3. An electrodynamic vibrator as claimed in claim 2, further comprising a slot defined in the end portion of the compressor shaft for accommodating the spring, screw threads defined in the end portion of the compressor shaft, at least two fitting nuts adapted to be threaded onto said shaft and to clamp the spring between two of said nuts.

4. An electrodynamic vibrator as claimed in claim 3, further comprising a loop formed by the free end of the spring, said loop being engageable around the column and displaceable with respect to the column so that its operative spring length may be varied.

5. An electrodynamic vibrator as claimed in claim 4, further comprising a spacer made of a material softer than the spring and positioned between the spring and the nut.

6. An electrodynamic vibrator as claimed in claim 5, wherein the spring comprises a plurality of spring plates helically wound around each other and lying in planes parallel to the direction of movement of the plunger.

References Cited

UNITED STATES PATENTS

| | | | |
|---|---|---|---|
| 2,054,097 | 9/1936 | Replogle | 230—55 |
| 2,627,811 | 2/1953 | Van Ryan | 103—53 XR |
| 3,007,625 | 11/1961 | Dolz | 230—55 |

ROBERT M. WALKER, Primary Examiner